United States Patent [19]

Maeda et al.

[11] Patent Number: 4,631,159
[45] Date of Patent: Dec. 23, 1986

[54] METHOD OF AGING EXPANSION-MOLDED BODY OF POLYOLEFIN

[75] Inventors: Hirofumi Maeda, Takatsuki; Kazuyoshi Watanabe; Naruhiko Akamatsu, both of Settsu; Kenichi Senda, Hirakata; Shunichi Nishioka, Kobe, all of Japan

[73] Assignee: Kanegafuchi Kagaku Kogyo Kabushiki Kaisha, Osaka, Japan

[21] Appl. No.: 676,180

[22] Filed: Nov. 29, 1984

[51] Int. Cl.$^4$ .............................. C08J 9/22; C08J 3/24
[52] U.S. Cl. .............................. 264/53; 264/DIG. 15; 264/DIG. 16; 264/DIG. 18; 264/101
[58] Field of Search ........ 264/53, DIG. 15, DIG. 16, 264/DIG. 18, 101

[56] References Cited

U.S. PATENT DOCUMENTS 3,953,558 4/1976 Hatano et al. .............. 264/DIG. 15
4,272,468 6/1981 Slocumb ..................... 264/DIG. 15
4,483,809 11/1984 Ando et al. ................. 264/DIG. 15

FOREIGN PATENT DOCUMENTS 49-128065 12/1974 Japan .
51-91971 8/1976 Japan .

OTHER PUBLICATIONS

Whittington's Dictionary of Plastics, by Lloyd R. Whittington, Stamford, Conn., Technomic, c1968, Preface, pp. 7, 15, 59, 60.

Primary Examiner—Philip Anderson
Attorney, Agent, or Firm—Antonelli, Terry & Wands

[57] ABSTRACT

A method for aging an expansion-molded body of polyolefin prepared by heating pre-expanded polyolefin particles within a mold involves cooling the molded body within the mold so that the molded body is not substantially smaller than the volume of the mold cavity and is temporarily expandable after being removed from the mold to not more than 110% relative to the volume in the mold cavity, removing the molded body from the mold, placing the molded body in an atmosphere substantially under atmospheric pressure and having a temperature of 25° to 55° C. lower than the melting point of the polyolefin while the volume of the molded body is 70 to 110% relative to the volume of the mold cavity and holding the molded body in this atmosphere until the temperature of the molded body is at least equal to the temperature of the atmosphere.

6 Claims, 10 Drawing Figures

METHOD OF AGING EXPANSION-MOLDED BODY OF POLYOLEFIN

The present invention relates to a method of curing or aging expansion-molded bodies of polyolefin prepared from pre-expanded particles of polyolefin. More particularly the invention relates to a method of curing a molded body removed from the mold by placing the molded body in an atmosphere having a specific temperature while the molded body has a specific volume and holding the molded body to obtain in a short period of time an expansion-molded body of polyolefin which is satisfactory in surface smoothness and adhesion of particles, less susceptible to sink shrinkage and shaped in close conformity to the shape of the mold.

Expansion molding processes for pre-expanded polyolefin particles employ a mold which is not hermetic but is capable of confining pre-expanded polyolefin particles therein, for example, a mold formed with a multiplicity of small perforations not permitting passage of the pre-expanded particles. With such a process, pre-expanded particles are filled into the mold, adhered to one another by heating and then cooled.

Already proposed as such expansion molding processes are (1) a process comprising forcing an inorganic gas into pre-expanded particles by the application of pressure to remedy shrinkage and impart additional expansion ability to the particles by preserving a pressure higher than the atmospheric pressure, for instance more than 1.18 atmosphere pressure within cells of the particles, and molding the particles in a mold (Published Examined Japanese Patent Application SHO 52-22951 and Published Unexamined Japanese Patent Application SHO 49-128065), (2) a process wherein pre-expanded particles are compressed and charged into a mold (Published Examined Japanese Patent Application SHO 53-33996), (3) a process wherein the mixture of steam and a specific gas is used for molding (Published Unexamined Japanese Patent Applicaiton SHO 51-88566), etc.

However, these processes have advantages and disadvantages and involve limitations on equipment and many problems to be solved. For example, the process (1) requires a process for pressurizing the pre-expanded particles, and the pressurized pre-expanded particles obtained thereby must be molded in a relatively short period of time while the particles retain a certain interior pressure higher than atmospheric pressure. Further the process (2) wherein pre-expanded particles are compressed and filled into a mold is adapted to give foaming ability by compressing the pellets and requires complicated apparatus designed to charge the compressed particles into a mold. Additionally it is necessary to connect the compressing equipment to the molding machine in operative relation therewith.

Furthermore the process (3) wherein the gas mixture of steam and a blowing gas is used for molding pre-expanded particles at the time of heating requires an apparatus for producing the gas mixture and is not advantageous process.

To avoid the use of such complicated molding apparatus, a process (4) has been proposed wherein preexpanded polyolefin particles incorporating no additional molding gas and having a internal pressure substantially equal to atmospheric pressure are foamed by heating as placed in a mold (Published Examined Japanese Patent Application No. SHO 55-7816).

With the process (4), the molded body obtained by heating is aged by giving the body a thermal history, i.e. by cooling the molded body to a temperature of below the softening point to room temperature, then heating the molded body to the softening point of the base material to a temperature 40° C. lower than the softening point and then slowly cooling the molded body stepwisely at different temperatures. The aging method requires a cumbersome procedure for controlling the temperature with time and also complicated equipment.

We have carried out intensive research to overcome the foregoing drawbacks and to provide, within a short period of time, an expansion-molded body of polyolefin which is satisfactory in surface smoothness and adhesion of particles and is less susceptible to sink shrinkage and found that a satisfactory molded body can be obtained within a short period of time when a molded body removed from the mold is aged as placed in an atmosphere having a temperature in a specific range before the molded body shrinks greatly. Thus the aging method of the present invention has been accomplished.

More specifically the present invention provides a method of curing an expansion-molded body of polyolefin characterized by removing from the mold a molded body prepared from pre-expanded polyolefin particles by expansion molding, placing the molded body into an atmosphere having a temperature 25° to 55° C. lower than the melting point of the base polyolefin resin while the volume of the molded body is 70 to 110% of the interior volume of the mold (hereinafter referred to as the "mold cavity"), and holding the molded body in the atmosphere until the temperature of the molded body equilibrates with the aging temperature of the atmosphere.

Generally, the molded body is prepared by heating the pre-expanded polyolefin particles filled in a mold and is cooled within the mold before removing therefrom. Then, the molded polyolefin body removed from the mold undergoes sink shrinkage and thereafter gradually expands again.

However, there is a difficulty that the body does not re-expand until it becomes a body with smooth-surface in good conformity with the mold cavity. Thus, in order to overcome such difficulty, several methods such as above mentioned processes (1)~(4) have been proposed. According to the present invention, the molded body removed from the mold is placed into an atmosphere of specified temperature before the molded body shrinks greatly or preferably while the volume of the molded body is larger than the volume of the cured molded body to be obtained, i.e. while the ratio of the volume of the removed molded body to the mold cavity (hereinafter referred to as the "volume ratio relative to the mold cavity") is 110 to 70%, preferably 110 to 90%.

Although the present invention produces a aging effect also on expansion-molded bodies having a volume ratio of more than 110% relative to the mold, such a molded body develops cracks in its surface as they expand to such an extent in the room-temperature atmosphere and becomes valueless as a commercial product. On the other hand, if the molded body is less than 70% in the volume ratio relative to the mold cavity, the molded body tends to develop wrinkles which are not removable by aging or requires a prolonged period of aging.

The time taken for the molded body to exhibit a volume ratio of 110 to 70% relative to the mold varies with the type of expansion molding process, the kind of polyolefin resin as the base material of the molded body, expansion molding conditions, the room temperature into which the molded body is released from the mold, etc. Such a volume ratio is achievable usually in about 0 to about 10 minutes and more perferable ratio is in about 0 to about 5 minutes after the molded body is removed from the mold.

In the present invention, it is also important to select a cooling condition before removing the molded body from the mold. In the present invention, the molded polyolefin body is removed from the mold after mild cooling, since when cooled excessively in the mold, the molding cycle is prolonged and furthermore the molded body undergoes excessive shrinkage which makes it difficult to remedy the resulting wrinkles.

Thus, it is important that the molded body within the mold is cooled within the extent that the molded body in the mold retains it volume almost 100% equivalent to the volume of the mold cavity without substantial shrinkage. In addition, it is preferable that the molded body is temporally expandable due to the internal pressure of the expansion-molded body under an atmosphere after being removed from the mold. However, it is preferred that, as represented by ③ in FIG. 10, the molded body is temporally expandable to more than 100%, but does not temporally expand to more than 110% in the volume ratio relative to the volume of the mold cavity. When the molded body removed from the mold expands excessively to such an extent of more than 110% of the mold cavity due to insufficient cooling within the mold, the molded body develops cracks in its surface and becomes valueless as a commercial product as mentioned before.

According to this invention, the expansion-molded body of polyolefin is aged at a temperature which is 25° to 55° C., preferably 30° to 45° C., lower than the melting point (measured by the DSC method) of the base polyolefin resin of the molded body. If the molded body is aged at a temperature higher than the temperature range, the base polyolefin resin becomes too soft to deform the body greatly or to permit shrinkage of the cellular membrane. On the other hand, if the molded body is aged at a temperature lower than the above range, the base polyolefin resin fails to soften sufficiently, retarding diffusion of gas through the cellular membrane and necessitating a very long period of time for aging. The aging temperature need not be varied but may be maintained substantially uniformly during aging.

The expansion-molded body is then released from the aging atmosphere into an atmosphere of room temperature and allowed to stand for a predetermined period of time. When the molded body is to be withdrawn from the aging atmosphere, the internal temperature of the molded body must be at least in equilibrium with the temperature of the aging atmpsphere.

The aging time is a major portion of the period of time taken for the production of finished expansion-molded bodies, so that to shorten the curing time greatly improves the productivity. The present invention affords an expansion-molded body of polyolefin having outstanding properties with an aging time of about 4 to about 24 hours or up to about 48 hours if longest.

Base polyolefin resins useful for the present invention are polyolefin resins consisting primarily of a polyolefin. Examples of such resins are low-density and medium- to high-density polyethylenes, copolymers of ethylene and a monomer copolymerizable therewith containing more than 50 weight % of ethylene, such as ethylene-propylene copolymer, ethylene-vinyl acetate copolymer, ethylene-acrylic acid copolymer, ethylene-ethyl acrylate copolymer and ethylene-vinyl chloride copolymer, propylene polymers selected from polypropylene homopolymers, ethylene-propylene copolymers with less content of ethylene such as ethylene-propylene random copolymer and ethylene-propylene block copolymers, polybutene-1, etc. Such resins are used singly or in admixture. Also, such resins are used with or without cross-linking. Of these resins, especially preferred is non-crosslinked linear low-density polyethylene (hereinafter referred to as "LLDPE") or crosslinked low-density polyethylene (hereinafter referred to as "crosslinked LDPE") or non-crosslinked propylene polymers.

Useful pre-expand particles of polyolefin are those prepared by various processes, e.g. a process wherein expandable resin pellets containing a blowing agent are foamed within a pressure-resistant container by heating with a heating medium such as steam, a process wherein expanded strands are prepared by an extruder and cut into expanded particles, a process wherein expandable pellets containing a blowing agent are dispersed in water and heated under pressure and then released into an atmosphere of atmospheric pressure to obtain expanded particles, etc.

Pre-expanded particles thus prepared are usually allowed to stand at room temperature and atmospheric pressure, or when required, are dried in hot air to stabilize the internal pressure of the particles to atmospheric pressure and are then subjected to expansion molding. Although the internal pressure of the particles need not always be atmospheric, it is naturally advantageous to employ preexpanded expanded particles having almost atmospheric internal pressure for commercial-scale production.

Thus, though according to the invention, any of the known expansion molding processes such as (1) to (4) as aforesaid is usable, the aging method of the invention is applicable especially favourably to the expansion molded body obtained by such a aforesaid process (4) which can be practiced by a simple expansion molding apparatus, but the product of which shrinks very greatly, i.e. the process wherein pre-expanded particles retaining an internal pressure substantially equal to atmsopheric pressure are charged into a mold and heated.

The present invention will be described with reference to the following examples and comparative examples. However, the invention is not limited to such examples only.

In the accompanying drawings:

FIGS. 1, 2, 4, 5, 7 and 8 are graphs showing the relationship between the aging time and the volume ratio after aging when the expansion-molded bodies to be aged have different volume ratios; and FIGS. 3, 6 and 9 are graphs showing the relationship between the aging time and the volume ratio after aging as determined at varying aging temperatures.

FIG. 10 is graph showing the conceipt of the present invention, wherein ①, ② and ④ are related to comparison examples, ③ represent the concept of the present invention, and ① to ④ shows the relation between the volume of the molded body and time under several molding conditions using molded bodies of LLDPE prepared by the similar method in Example 1. In FIG. 10 solid lines show the relation in case of no aging, broken lines show the relation in case of aging, and ③-2 of solid line shows the relation when the molded body is placed under room temperature atmosphere after aging for 20 hours.

case of no aging, broken lines show the relation in case of aging, and •3 -2 of solid line shows the relation when the molded body is placed under room temperature atmosphere after aging for 20 hours.

PRODUCTION EXAMPLE 1

(production of pre-expanded particles)

LLDPE pellets (100 parts by weight, 25 kg) containing 0.01 part of talc and having a temperature gradient of melt tension of about 585, a melting point of 117° C. as determined by the DSC method, a density of 0.920 g/cm$^3$, MI of 0.8 g/10 min and a diameter of 2 mm calculated as spheres were dispersed in 300 parts of water within a pressure-resistant container having a capacity of 100 liters and equipped with a stirrer, using 0.5 part of powdery basic calcium tertiary phosphate and 0.006 part of sodium dodecylbenzenesulfonate as dispersants. While stirring the dispersion, 45 parts of dichlorodifluoromethane was added thereto, and the mixture was heated to 112° C. At this time, the pressure-resistant container had an internal pressure of 26 kg/cm$^2$.G.

Subsequently a discharge valve at a lower portion of the pressure-resistant container was opened to release the mixture of LLDPE pellets and aqueous solution into an atmosphere of atmospheric pressure through a circular orifice, 4 mm in diameter, of an orifice plate attached to the rear end of the valve, giving expanded particles having an apparent expansion ratio of 47 times (hereinafter referred to as "pre-expanded LLDPE particles (A)") and particles having an apparent expansion ratio of 36 times (hereinafter referred to as "pre-expanded LLDPE particles (B)").

PRODUCTION EXAMPLE 2

(production of pre-expanded particles)

Pellets (2.6 mm in diameter calculated as spheres) of crosslinked LDPE (109° C. in melting point, 0.922 in density, 1.5 g/10 min in MI and 49% in gel fraction) obtained by crosslinking low-density polyethylene were placed into a pressure-resistant container and impregnated with dichlorodifluoromethane at 60° C. for 2 hours under increased pressure to obtain pellets impregnated with 15 wt. % of the methane. The impregnated pellets were heated with steam within the container to obtain expanded particles having an apparent expansion ratio of 36 times (hereinafter referred to as "pre-expanded crosslinked LDPE particles (C)") and particles having an apparent expansion ratio of 20 times (hereinafter referred to as "pre-expanded crosslinked LDPE particles (D)").

PRODUCTION EXAMPLE 3

(production of pre-expanded particles)

Pellets (25 kg : 100 parts by weight, 2 mm in diameter calculated as spheres) of ethylene-propylene random copolymer (ethylene content: 4.5 weight %, a melting point of 136° C. as determined by the DSC method, a density of 0.900 g/cm$^3$, MI of 9.0 g/10 min) containing 0.01 part by weight of talc were dispersed in 300 parts by weight of water within a pressure-resistant container having a capacity of 100 liters and equipped with a stirrer, using 1.2 parts by weight of powdery basic calcium tertiary phosphate. While stirring the dispersion, 35 parts by weight of dichlorodifluoromethane was added thereto, and the mixture was heated to 136° C. At this time, the pressure-resistant container had an internal pressure of 26 Kg/cm$^2$.G.

Subsequently a discharge valve at a lower portion of the pressure-resistant container was opened to release the mixture of the pellets and aqueous solution into an atmosphere of atmospheric pressure through a circular orifice, 4 mm in diameter, of an orifice plate attached to the rear end of the valve, giving expanded particles having an apparent expansion ratio of 45 times (hereinafter referred to as "pre-expanded non-crosslinked ethylene-propylene random copolymer particles (E)").

EXAMPLE 1

The pre-expanded LLDPE particles (A) prepared in Production Example 1 were placed into a metal net cage and allowed to stand at room temperature for 48 hours.

The pre-expanded particles were then filled into a mold 270×290×50 mm in the inside dimensions of its cavity, capable of confining the particles therein but not hermetic and having perforations for supplying heating steam. The particles were heated for 10 to 30 seconds with steam supplied at 0.5 to 1.5 kg. cm$^2$.G, foamed and adhered to one another within the mold, then cooled with water and thereafter released from the mold into an atmosphere of room temperature.

The molded body was allowed to stand at room temperature for a period of time listed in Table 1 after having been released from the mold into the room-temperature atmosphere, then placed into an atmosphere having an aging temperature listed in the same table, aged for 4 to 48 hours and thereafter allowed to stand at room temperature for 24 hours. The molded body of LLDPE obtained was checked for volume (volume ratio relative to the mold cavity after aging) and thickness (degree of sink shrinkage). Table 1 shows the results.

A procedure similar to the above was repeated with use of the pre-expanded LLDPE particles (B) under the conditions given in Tables 2 to 4 with the results listed therein.

"Molded body volume ratio" listed refers to the volume ratio of the molded body relative to the mold cavity immediately before it was placed into the aging atmosphere. The volume was measured by completely immersing the body in water in a graduated container and reading the rise of the water level.

The thickness t of the molded body was measured at a portion (point 50×50 mm from corner) where the thickness was most variable to evaluate the degree of sink shrinkage according to the following criteria.

A: 49.0 < t ≦ 51.0
B: 51.0 < t ≦ 52.5
C: 52.5 < t
D: 47.5 < t ≦ 49.0
E: 47.5 ≧ t

A gives the most excellent molded body. With B and C, a further shortened curing time, or adjustment of the aging temperature, or extension of the standing time before aging gives an excellent molded body. With D and E, however, a desired molded body is hardly available or the wrinkles can not be remedied even if the aging time is extended to whatever extent.

TABLE 1

| Standing time (sec.) | Molded body volume ratio (vol. %) | Aging temp. (°C.) | Aging time (hrs.) | Volume ratio after curing (vol. %) | Sink |
|---|---|---|---|---|---|
| 40 | 115 | 80 | 4 | 81 | E |
| 40 | 115 | 80 | 24 | 86 | A |
| 70 | 110 | 80 | 4 | 80 | E |
| 70 | 110 | 80 | 24 | 85 | A |
| 200 | 90 | 80 | 4 | 77 | E |
| 200 | 90 | 80 | 24 | 83 | D |
| 200 | 90 | 80 | 48 | 84 | A |
| 420 | 68 | 80 | 4 | 76 | E |
| 420 | 68 | 80 | 24 | 81 | E |
| 420 | 68 | 80 | 48 | 82 | E |
| 600 | 60 | 80 | 4 | 75 | E |
| 600 | 60 | 80 | 24 | 80 | E |
| 600 | 60 | 80 | 48 | 81 | E |

Cracks developed in the surfaces of the molded bodies with a molded body volume ratio of 115%.

TABLE 2

| Standing time (sec.) | Molded body volume ratio (vol. %) | Aging temp. (°C.) | Aging time (hrs.) | Volume ratio after curing (vol. %) | Sink |
|---|---|---|---|---|---|
| 90 | 115 | 80 | 4 | 83 | B |
| 90 | 115 | 80 | 24 | 92 | C |
| 90 | 110 | 80 | 4 | 82 | D |
| 90 | 110 | 80 | 12 | 86 | A |
| 240 | 90 | 80 | 4 | 79 | E |
| 240 | 90 | 80 | 24 | 87 | A |
| 600 | 68 | 80 | 4 | 76 | E |
| 600 | 68 | 80 | 24 | 86 | A |
| 1200 | 60 | 80 | 4 | 74 | E |
| 1200 | 60 | 80 | 48 | 84 | D |

Cracks developed in the surfaces of the molded bodies with a molded body volume ratio of 115%, and wrinkles occurred on the surfaces of the molded bodies with a molded body volume ratio of 60%.

TABLE 3

| Standing time (sec.) | Molded body volume ratio (vol. %) | Aging temp. (°C.) | Aging time (hrs.) | Volume ratio after curing (vol. %) | Sink |
|---|---|---|---|---|---|
| 90 | 115 | 62 | 4 | 80 | E |
| 90 | 115 | 62 | 24 | 87 | A |
| 90 | 110 | 62 | 4 | 79 | E |
| 90 | 110 | 62 | 24 | 85 | A |
| 240 | 90 | 62 | 4 | 77 | E |
| 240 | 90 | 62 | 24 | 83 | D |
| 240 | 90 | 62 | 48 | 84 | A |
| 600 | 68 | 62 | 4 | 75 | E |
| 600 | 68 | 62 | 24 | 81 | E |
| 600 | 68 | 62 | 48 | 82 | E |
| 1200 | 60 | 62 | 4 | 73 | E |
| 1200 | 60 | 62 | 24 | 79 | E |
| 1200 | 60 | 62 | 48 | 81 | E |

Cracks developed in the surfaces of the molded bodies with a molded body volume ratio of 115%, and wrinkles occurred on the surfaces of the molded bodies with a molded body volume ratio of 60%.

TABLE 4

| Standing time (sec.) | Molded body volume ratio (vol. %) | Aging temp. (°C.) | Aging time (hrs.) | Volume ratio after curing (vol. %) | Sink |
|---|---|---|---|---|---|
| 90 | 115 | 52 | 4 | 76 | E |
| 90 | 115 | 52 | 24 | 83 | D |
| 90 | 110 | 52 | 4 | 75 | E |
| 90 | 110 | 52 | 24 | 81 | E |
| 90 | 110 | 52 | 48 | 82 | E |
| 240 | 90 | 52 | 4 | 73 | E |
| 240 | 90 | 52 | 24 | 79 | E |
| 240 | 90 | 52 | 48 | 81 | E |

Cracks developed in the surfaces of the molded bodies with a molded body volume ratio of 115%.

FIGS. 1 to 3 are graphs showing the relationship between the aging time and the volume ratio after aging, as determined when the molded bodies to be aged had varying volume ratios relative to the mold or aged at varying temperatures.

The hatched area in each of FIGS. 1 to 3 represents a range wherein molded bodies of the ethylene polymer were obtained with a smooth surface and good dimensional stability.

FIG. 1 is a graph showing the results obtained when molded bodies prepared from pre-expanded LLDPE particles (A) and having varying volume ratios were aged at a temperature of 80° C. FIG. 2 is a graph showing the results obtained when molded bodies prepared from pre-expanded LLDPE particles (B) and having varying volume ratios were aged at a temperature of 80° C. FIG. 3 is a graph showing the results obtained when molded bodies prepared from pre-expanded LLDPE particles (B) and having a volume ratio of 110% were cured at varying temperatures.

FIGS. 1 and 2 show that molded body volume ratios of 110 to 70% provide excellent molded bodies with a shorter aging time, while FIG. 3 reveals that the aging can be completed more rapidly when the aging temperature is 25 to 55° C. lower than the melting point (117° C.) of LLDPE.

EXAMPLE 2

Expansion-molded bodies of crosslinked LDPE were obtained in the same manner as in Example 1 with the exception of using the pre-expanded crosslinked LDPE particles (C) and (D) prepared in Production Example 2 as pre-expanded particles.

The molded bodies were aged under the conditions listed in Tables 5 to 8 and thereafter allowed to stand at room temperature for 24 hours. The molded bodies obtained were checked for properties in the same manner as in Example 1. The results are given in Tables 5 to 8.

Tables 5 to 7 show the results achieved with use of the pre-expanded crosslinked LDPE particles (C), and Table 8 shows those achieved with use of the pre-expanded crosslinked LDPE particles (D).

TABLE 5

| Standing time (sec.) | Molded body volume ratio (vol. %) | Aging temp. (°C.) | Aging time (hrs.) | Volume ratio after curing (vol. %) | Sink |
|---|---|---|---|---|---|
| 45 | 115 | 75 | 4 | 82 | E |
| 45 | 115 | 75 | 24 | 88 | B |
| 120 | 110 | 75 | 4 | 81 | E |

TABLE 5-continued

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 120 | 110 | 75 | 24 | 87 | A |
| 240 | 90 | 75 | 4 | 80 | E |
| 240 | 90 | 75 | 24 | 86 | A |
| 600 | 68 | 75 | 4 | 79 | E |
| 600 | 68 | 75 | 24 | 84 | D |
| 600 | 68 | 75 | 48 | 85 | D |
| 1200 | 68 | 75 | 4 | 77 | E |
| 1200 | 68 | 75 | 48 | 84 | D |

Cracks developed in the surfaces of the molded bodies with a molded body volume ratio of 115%, and wrinkles occurred on the surfaces of the molded bodies with a molded body volume of 60%.

TABLE 6

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 45 | 115 | 60 | 4 | 79 | E |
| 45 | 115 | 60 | 24 | 84 | D |
| 120 | 110 | 60 | 4 | 77 | E |
| 120 | 110 | 60 | 24 | 83 | D |
| 120 | 110 | 60 | 48 | 84 | A |
| 240 | 90 | 60 | 4 | 76 | E |
| 240 | 90 | 60 | 24 | 83 | D |
| 240 | 90 | 60 | 48 | 84 | A |
| 600 | 68 | 60 | 4 | 75 | E |
| 600 | 68 | 60 | 24 | 81 | E |
| 600 | 68 | 60 | 48 | 83 | D |
| 1200 | 60 | 60 | 4 | 74 | E |
| 1200 | 60 | 60 | 24 | 79 | E |
| 1200 | 60 | 60 | 48 | 81 | E |

Cracks developed in the surfaces of the molded bodies with a molded body volume ratio of 115%, and wrinkles occurred on the surfaces of the molded bodies with a molded body volume ratio of 60%.

TABLE 7

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 45 | 115 | 52 | 4 | 77 | E |
| 45 | 115 | 52 | 24 | 82 | D |
| 120 | 110 | 52 | 4 | 75 | E |
| 120 | 110 | 52 | 24 | 81 | E |
| 120 | 110 | 52 | 48 | 82 | E |
| 240 | 90 | 52 | 4 | 74 | E |
| 240 | 90 | 52 | 24 | 80 | E |
| 240 | 90 | 52 | 48 | 82 | E |

Cracks developed in the surfaces of the molded bodies with a molded body volume ratio of 115%.

TABLE 8

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 30 | 115 | 75 | 4 | 84 | D |
| 30 | 115 | 75 | 24 | 91 | C |
| 90 | 110 | 75 | 4 | 84 | D |
| 90 | 110 | 75 | 12 | 87 | A |
| 240 | 90 | 75 | 4 | 83 | D |
| 240 | 90 | 75 | 24 | 87 | B |

TABLE 8-continued

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 600 | 68 | 75 | 4 | 80 | E |
| 600 | 68 | 75 | 24 | 86 | A |
| 1200 | 60 | 75 | 4 | 79 | E |
| 1200 | 60 | 75 | 24 | 85 | A |

Cracks developed in the surfaces of the molded bodies with a molded body volume ratio of 115%, and wrinkles occurred on the surfaces of the molded bodies with a molded body volume ratio of 60%.

FIGS. 4 to 6 are graphs showing the relationship between the curing time and the volume ratio after curing, as determined when the molded bodies to be aged had varying volume ratios relative to the mold cavity or aged to varying temperatures.

The hatched area in each of FIGS. 4 to 6 represents 84 to 88% of volume ratios of molded bodies relative to the mold cavity which is a range affording molded bodies of a ethylene polymer with a smooth surface and good dimensional stability.

FIG. 4 is a graph showing the results obtained when molded bodies prepared from pre-expanded crosslinked LDPE particles (C) and having varying volume ratios were cured at a temperature of 75° C. FIG. 5 is a graph showing the results obtained when molded bodies prepared from pre-expanded crosslinked LDPE particles (D) and having varying volume ratios were aged at a temperature of 75° C. FIG. 6 is a graph showing the results obtained when molded bodies prepared from pre-expanded crosslinked LDPE particles (C) and having a volume ratio of 110% were aged at varying temperatures.

FIGS. 4 to 5 show that molded body volume ratios of 110 to 70% provide excellent molded bodies with a shorter aging time, while FIG. 6 reveals that the aging can be completed more rapidly when the aging temperature is 25 to 55° C. lower than the melting point (109° C.) of crosslinked LDPE.

EXAMPLE 3

Expansion-molded bodies of non-crosslinked ethylene-propylene random copolymer were obtained in the same manner as in Example 1 with the exceptions of using the pre-expanded non-crosslinked ethylene-propylene random copolyemr particles (E) and of employing steam supplied at 0.5 to 2.1 kg/cm$^2$.G.

The molded bodies were aged under the conditions listed in Table 9 to 11 and thereafter allowed to stand at room temperature for 24 hours. The molded bodies obtained were checked for properties in the same manner as in Example 1. The results are given in Tables 9 to 11.

FIGS. 7 to 9 are graphs showing the relationship between the aging time and the volume ratio after aging, as determined when the molded bodies to be aged had varying volume ratios relative to the mold cavity or cured at varying temperature.

The hatched area in each of FIGS. 7 to 9 represents 89 to 96 % of volume ratios of molded bodies relative to the mold cavity which is a range affording molded bodies of a propylene polymer with a smooth surface and good dimensional stability.

FIGS. 7 to 8 show that molded body volume ratios of 110 to 70% provide excellent molded bodies with a shorter curing time, while FIG. 9 reveals that the aging can be completed more rapidly when the aging temperature is 25° to 55° C. lower than the melting point (135° C.) of the ethylene-propylene random copolymer employed.

TABLE 9

Figure 1:
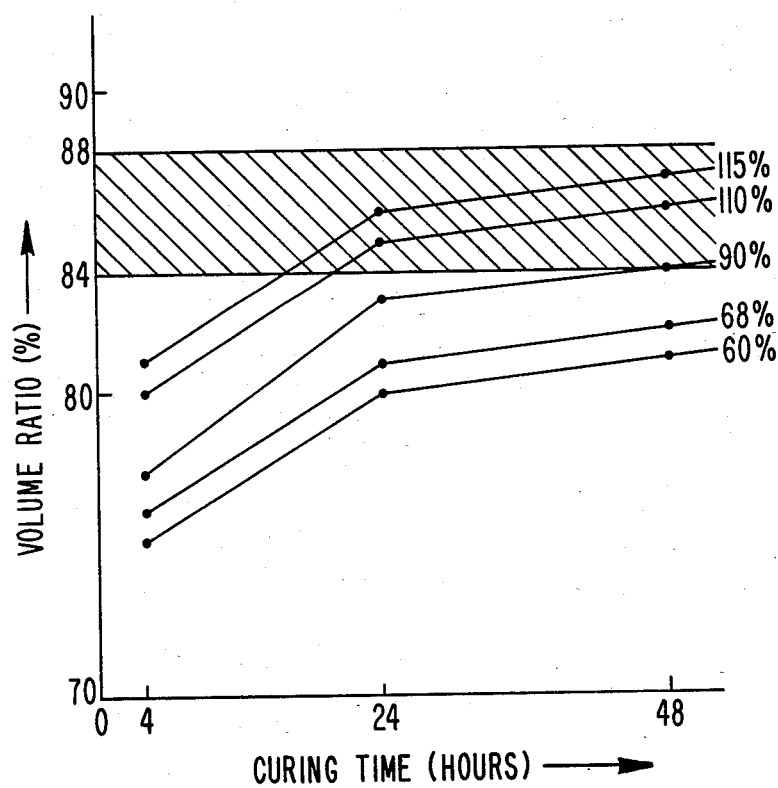
Figure 2:
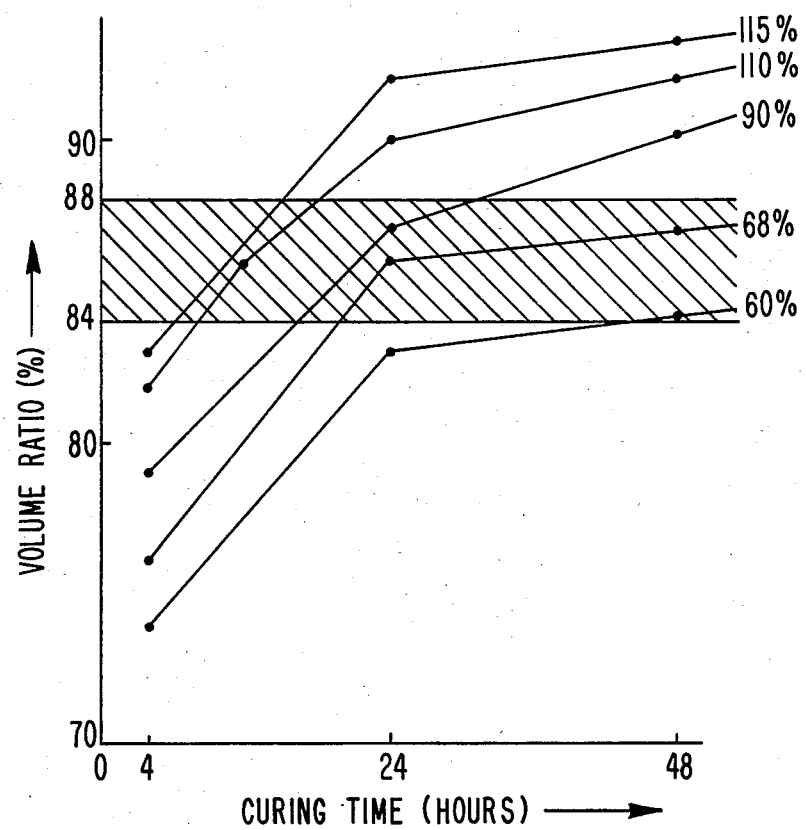
Figure 3:
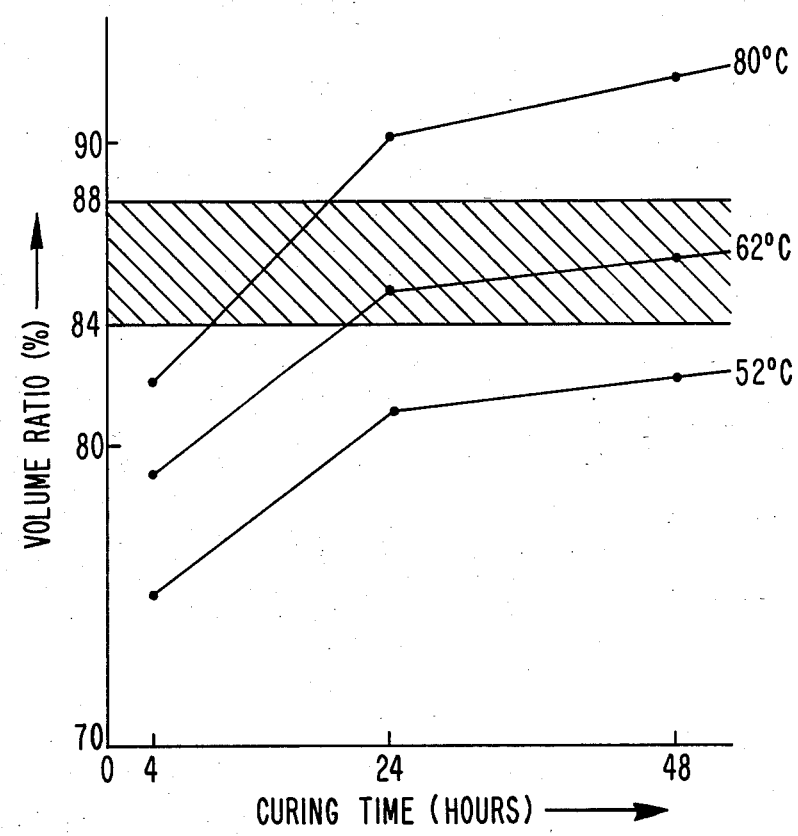
Figure 4:
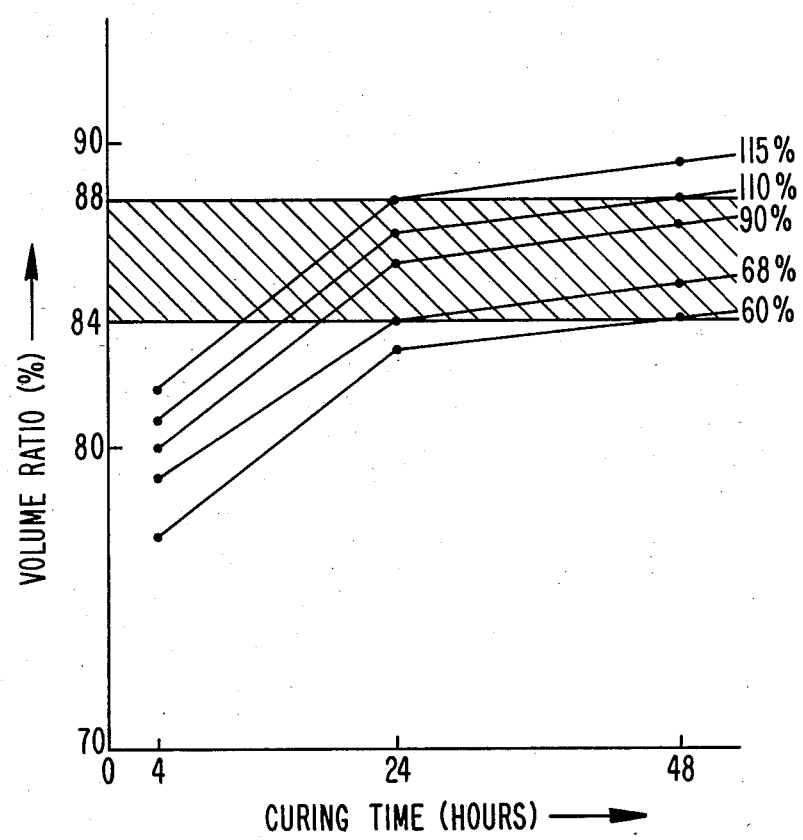
Figure 5:
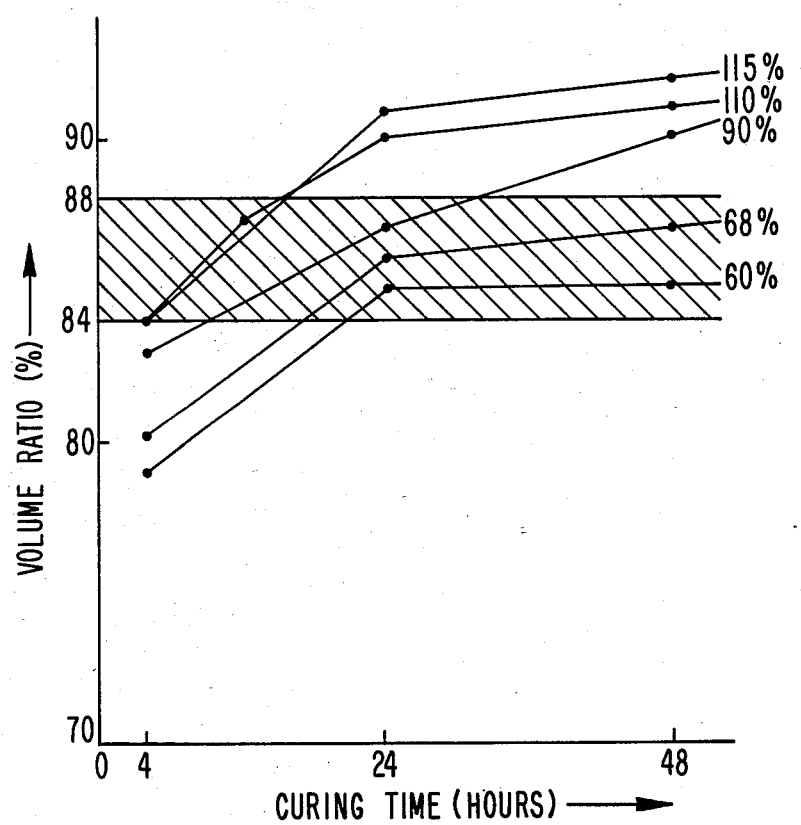
Figure 6:
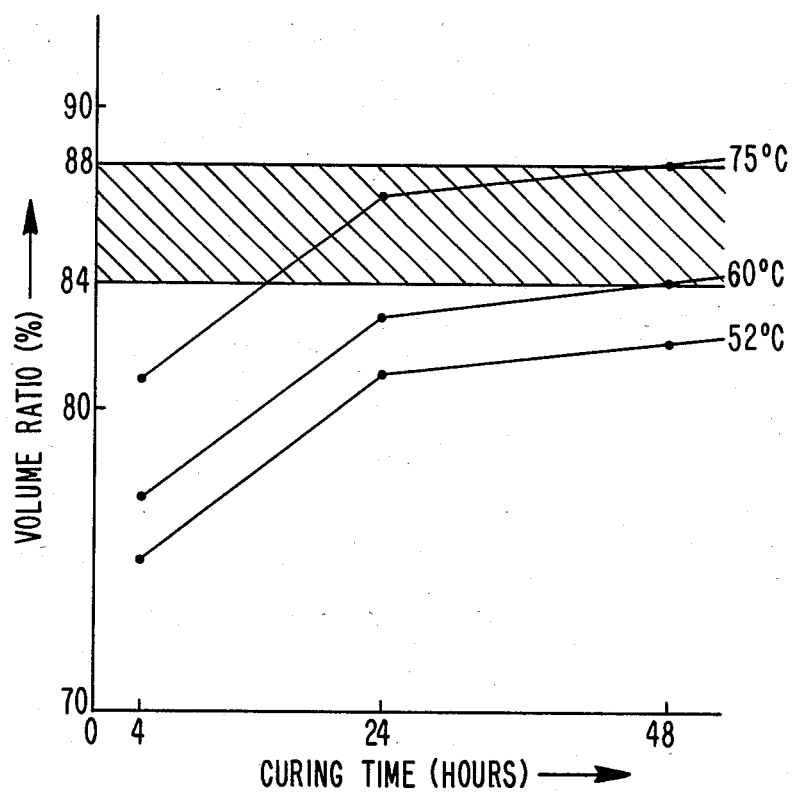
Figure 7:
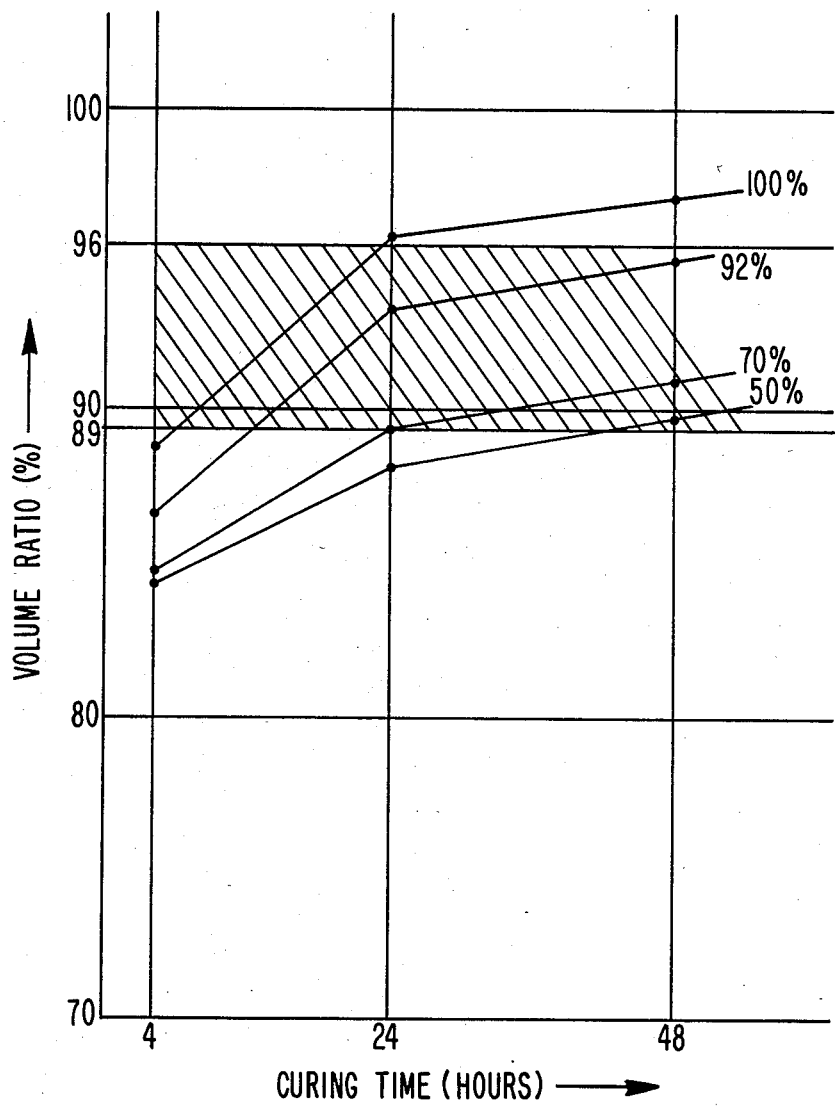
FIGS. 7 and 8 are graphs showing the results obtained when molded bodies prepared from pre-expanded non-crosslinked ethylene-propylene random copolymer particles (E) and having varying volume ratios were aged at a temperature of 105° C. and 90° C., respectively.
Figure 8:
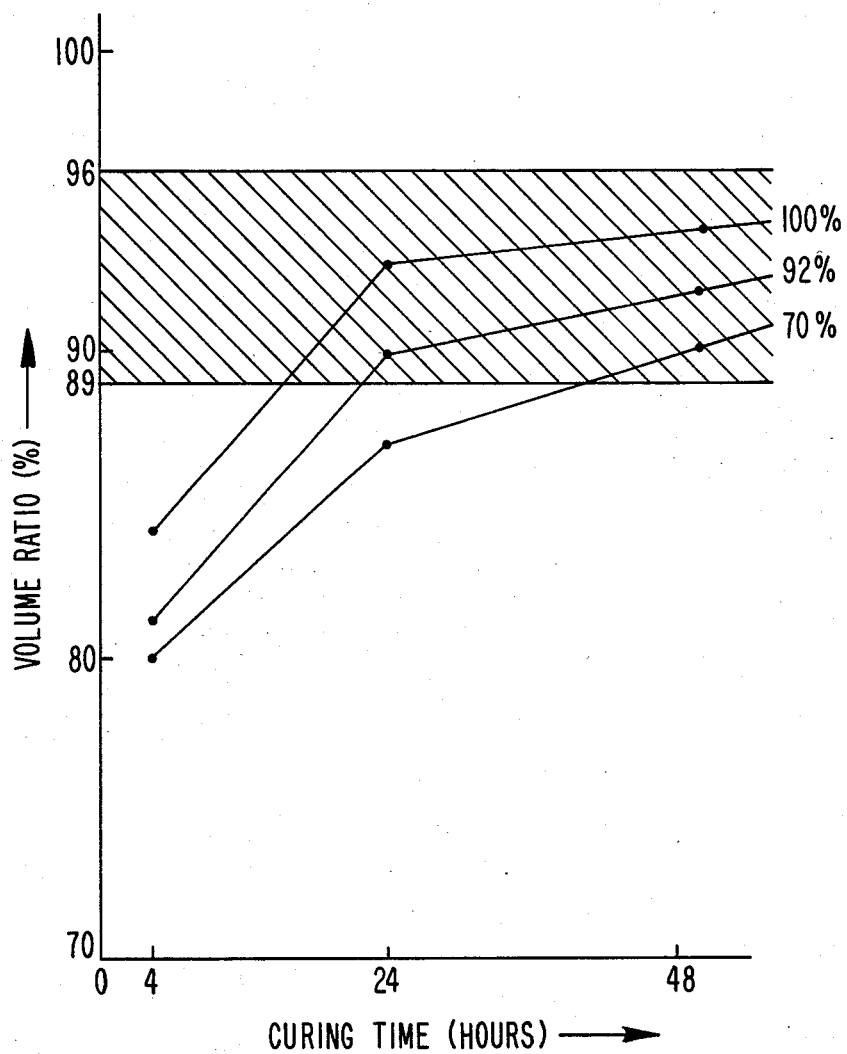
Figure 9:
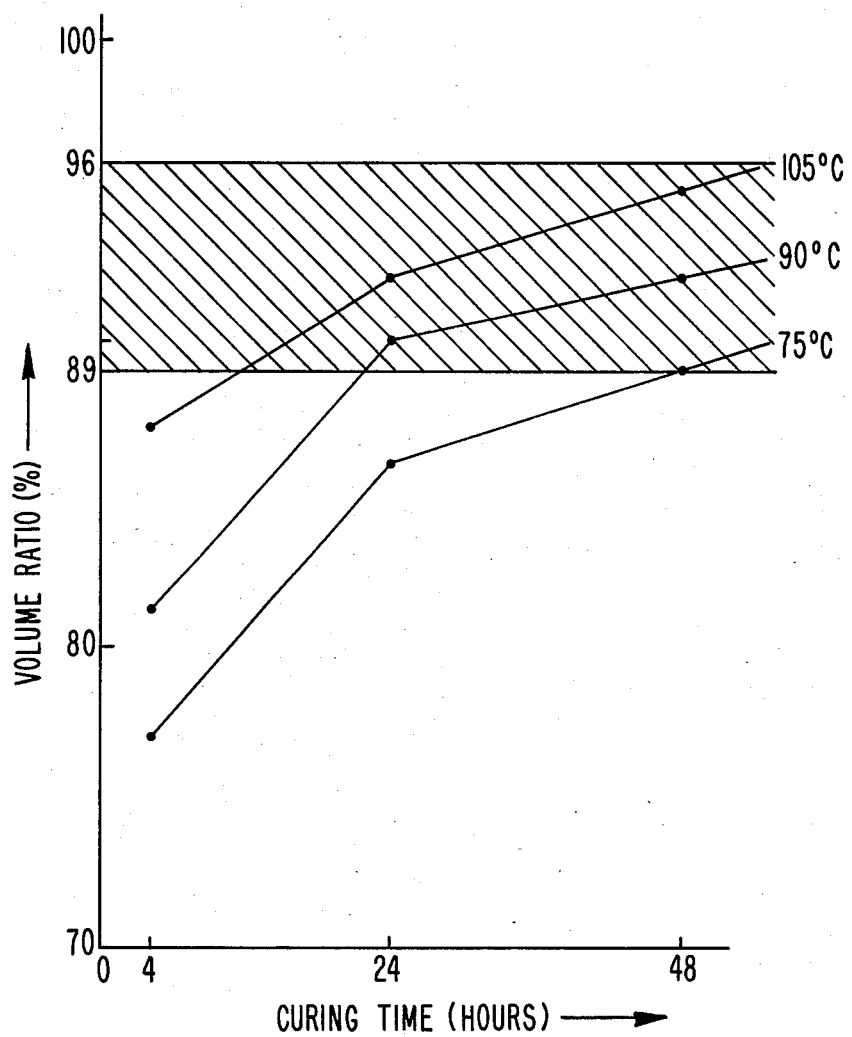
FIG. 9 is a graph showing the results obtained when molded bodies prepared from pre-expanded non-crosslinked ethylene-propylene random copolymer particles (E) and having the volume ratio fo 92 % were aged at varying temperatures.
Figure 10:
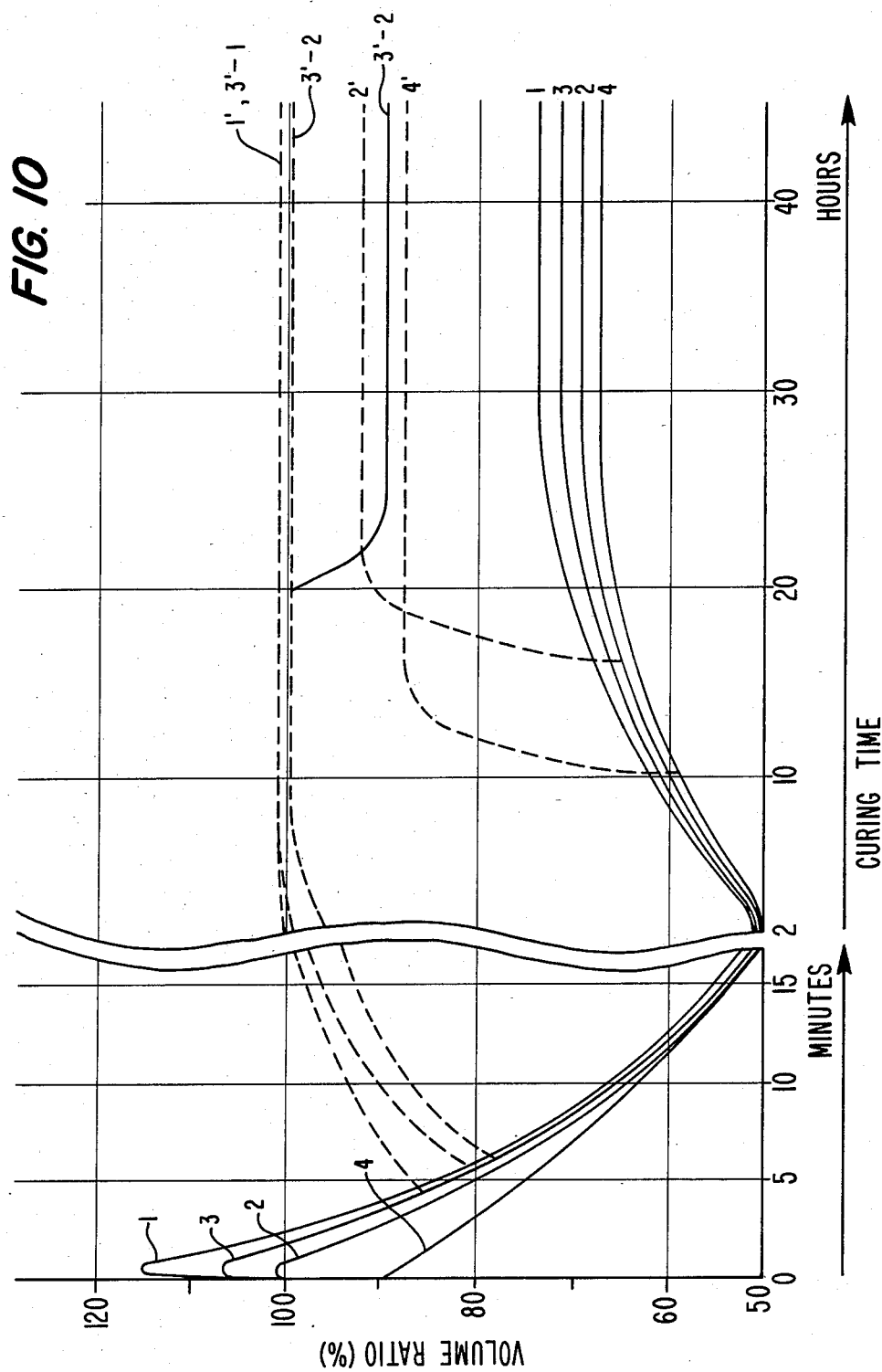

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 40 | 100 | 105 | 4 | 89 | D |
| 40 | 100 | 105 | 24 | 96 | B |
| 60 | 92 | 105 | 4 | 87 | E |
| 60 | 92 | 105 | 24 | 93 | A |
| 180 | 70 | 105 | 4 | 84 | E |
| 180 | 70 | 105 | 24 | 90 | D |
| 180 | 70 | 105 | 48 | 92 | A |
| 300 | 50 | 105 | 4 | 84 | E |
| 300 | 50 | 105 | 24 | 89 | D |
| 300 | 50 | 105 | 48 | 90 | D |

TABLE 10

| Standing time (sec.) | Molding body volume ratio (vol. %) | Aging temp. (°C.) | Aging time (hrs.) | Volume ratio after curing (vol. %) | Sink |
| --- | --- | --- | --- | --- | --- |
| 40 | 100 | 90 | 4 | 84 | E |
| 40 | 100 | 90 | 24 | 93 | A |
| 60 | 92 | 90 | 4 | 81 | E |
| 60 | 92 | 90 | 24 | 90 | D |
| 60 | 92 | 90 | 48 | 92 | A |
| 180 | 70 | 90 | 4 | 80 | E |
| 180 | 70 | 90 | 24 | 87 | E |
| 180 | 70 | 90 | 48 | 90 | A |

TABLE 11

| Standing time (sec.) | Molded body volume ratio (vol. %) | Aging temp. (°C.) | Aging time (hrs.) | Volume ratio after curing (vol. %) | Sink |
| --- | --- | --- | --- | --- | --- |
| 60 | 92 | 75 | 4 | 77 | E |
| 60 | 92 | 75 | 24 | 86 | E |
| 60 | 92 | 75 | 48 | 89 | E |

What is claimed is:

1. A method of aging an expansion-molded body of polyolefin prepared by heating the pre-expanded polyolefin particles filled in a mold which comprises cooling the molded body in the mold within the extent that the molded body in the mold is not substantially smaller than the volume of the mold cavity and is temporarily expandable after being removed from the cavity to not more than 110% relative to the volume of the mold cavity, removing the molded body from the mold, placing the molded body into an atmosphere substantially under atmospheric pressure having a temperature 25° to 55° C. lower than the melting point of the base polyolefin resin while the volume of the molded body is 70 to 110% relative to the volume of the mold cavity, and holding the molded body in the atmosphere until the temperature of the molded body at least equilibriates with the temperature of the atmosphere.

2. An aging method as defined in claim 1 wherein the molded body in the mold is cooled within the extent that the molded body in the mold retains its volume almost 100% equivalent to the volume of the mold cavity and is temporally expandable under an atmosphere after being removed from the mold to not more than 110% relative to the volume of the mold cavity.

3. An aging method as defined in claim 1 wherein the molded body is placed into the atmosphere having a temperature 25° to 55° C. lower than the melting point of the base polyolefin resin while the volume of the molded body is 90 to 110% relative to the volume of the mold cavity.

4. An aging method as defined in claim 1 wherein the internal pressure of the pre-expanded polyolefin particles to be filled into a mold is substantially equal to atmospheric pressure.

5. An aging method as defined in claim 1, wherein the molded body is made of an ethylene polymer and aging is performed to 84 to 88% of volume ratio of the molded body relative to the mold cavity.

6. An aging method as defined in claim 1, wherein the molded body is made of a propylene polymer and aging is performed to 89 to 96% of volume ratio of the molded body relative to the mold cavity.

* * * * *